United States Patent
Yoo et al.

(10) Patent No.: US 10,976,736 B2
(45) Date of Patent: Apr. 13, 2021

(54) DEVICE AND METHOD FOR ASSISTING WITH DRIVING OF VEHICLE

(71) Applicant: SAMSUNG ELECTRONICS CO., LTD., Suwon-si (KR)

(72) Inventors: Jin Woo Yoo, Suwon-si (KR); Mid Eum Choi, Suwon-si (KR); Chang Soo Park, Suwon-si (KR); A Ron Baik, Suwon-si (KR); Je Woong Ryu, Suwon-si (KR); In Hak Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 16/237,294

(22) Filed: Dec. 31, 2018

(65) Prior Publication Data

US 2019/0227545 A1    Jul. 25, 2019

(30) Foreign Application Priority Data

Jan. 22, 2018 (KR) .................. 10-2018-0007888

(51) Int. Cl.
*G05D 1/00* (2006.01)
*G01C 21/30* (2006.01)
(Continued)

(52) U.S. Cl.
CPC .......... *G05D 1/0061* (2013.01); *G01C 21/30* (2013.01); *G01C 21/34* (2013.01); *G05D 1/0223* (2013.01); *G05D 2201/0213* (2013.01)

(58) Field of Classification Search
CPC .... G01C 21/30; G01C 21/32; G01C 21/3697; G01C 21/3617; G01C 21/34; G06F 16/29;
(Continued)

(56) References Cited

U.S. PATENT DOCUMENTS

| 8,527,199 B1 | 9/2013 | Burnette et al. |
| 10,215,572 B2 | 2/2019 | Urano et al. |

(Continued)

FOREIGN PATENT DOCUMENTS

| JP | 2017-90548 A | 5/2017 |
| JP | 2017-146724 A | 8/2017 |

(Continued)

OTHER PUBLICATIONS

Search Report and Written Opinion dated Apr. 1, 2019, issued by the International Searching Authority in International Application No. PCT/KR2018/016618 (PCT/ISA/210 and PCT/ISA/237).
Communication dated Aug. 4, 2020, issued by the European Patent Office in counterpart European Application No. 18900974.9.

*Primary Examiner* — Behrang Badii
(74) *Attorney, Agent, or Firm* — Sughrue Mion, PLLC

(57) ABSTRACT

Provided are a method and a device for assisting with driving of a vehicle, the method including sensing an ambient environment of location of a vehicle by using one or more sensors mounted on or in the vehicle; obtaining sensing information about the ambient environment based on the sensing of the ambient environment; comparing map information stored in the vehicle with the obtained sensing information; determining a map reliability of the map information based on a result of the comparing; and controlling the driving of the vehicle based on the determined map reliability.

16 Claims, 17 Drawing Sheets

(51) Int. Cl.
*G01C 21/34* (2006.01)
*G05D 1/02* (2020.01)

(58) Field of Classification Search
CPC ............ G06F 16/2379; G06F 16/2365; G06F 16/215; G05D 1/0077; G05D 1/0251; G05D 1/0274; G05D 1/0061; G05D 1/0055; G05D 1/0276; G05D 1/0214; G05D 1/0088; G05D 1/0223; G05D 2201/0213; B60T 7/22; G06K 9/00798; G06K 9/00791; G06K 9/00805; G06K 1/00201; G08G 1/0141; G08G 1/163; G08G 1/09626; G08G 1/096725; G08G 1/0133; G08G 1/0112; G08G 1/096741; G08G 1/0129; G08G 1/09675; G08G 1/096775; H04W 4/40; H04W 4/024; B60W 30/08; G06T 7/50; G06T 7/507; G06T 7/11; G06T 7/20

See application file for complete search history.

(56) References Cited

U.S. PATENT DOCUMENTS

| | | | |
|---|---|---|---|
| 2007/0299606 | A1* | 12/2007 | Fujimoto ................. B60T 7/22 701/450 |
| 2010/0241354 | A1 | 9/2010 | Stahlin et al. |
| 2016/0259335 | A1* | 9/2016 | Oyama ................ G05D 1/0251 |
| 2016/0259814 | A1* | 9/2016 | Mizoguchi ......... G01C 21/3837 |
| 2016/0292998 | A1* | 10/2016 | Obuchi ................ G05D 1/0287 |
| 2017/0108867 | A1 | 4/2017 | Franzius et al. |
| 2017/0206787 | A1* | 7/2017 | Ando ..................... G08G 1/163 |
| 2018/0012367 | A1* | 1/2018 | Dane ........................ G06T 7/50 |
| 2018/0056992 | A1* | 3/2018 | Sogen ................. G08G 1/0112 |
| 2018/0205925 | A1 | 7/2018 | Doh et al. |

FOREIGN PATENT DOCUMENTS

| | | |
|---|---|---|
| KR | 10-2017-0007102 A | 1/2017 |
| KR | 10-2017-0133149 A | 12/2017 |
| WO | 2014085380 A1 | 6/2014 |

* cited by examiner

DEVICE AND METHOD FOR ASSISTING WITH DRIVING OF VEHICLE

CROSS-REFERENCE TO RELATED APPLICATION

This application is based on and claims priority under 35 U.S.C. § 119 to Korean Patent Application No. 10-2018-0007888, filed on Jan. 22, 2018, in the Korean Intellectual Property Office, the disclosure of which is incorporated by reference herein in its entirety.

BACKGROUND

1. Field

The disclosure relates to a device and a method for assisting with driving of a vehicle, and more particularly to, a device and a method for assisting with driving of a vehicle based on map reliability.

2. Description of Related Art

Recently, owing to the convergence of information communication technologies and the car industry, cars have rapidly become more and more smart. Accordingly, a car has evolved from a simple mechanism to a smart car, with autonomous driving being particularly highlighted as a core technology of smart cars.

Autonomous vehicles autonomously drive to a given destination by recognizing an ambient environment without an intervention of a driver, determining a driving condition, and controlling vehicles. Such autonomous vehicles have recently attracted attention as a personal transportation means capable of increasing convenience by reducing traffic accidents, improving traffic efficiency, saving fuel, and driving on behalf of the driver.

For such autonomous vehicles, various technologies such as a technology for recognizing the driving environment (e.g., car lanes, ambient vehicles, pedestrians, etc.), a technology for determining the driving condition, a control technology such as steering, acceleration/deceleration, etc., are utilized. Among these technologies, the technology for accurately recognizing the driving environment of a vehicle is of particular importance. That is, it is necessary to generate a map having a small error range and accurately determine the ambient environment of the vehicle on the generated map.

In such a situation, for autonomous driving of various mobile bodies including a vehicle, there is a need for a technology of generating and using a highly reliable map regarding actual road circumstances and conditions.

SUMMARY

Provided are a device and a method for assisting with driving of a vehicle, and a non-transitory a computer-readable recording medium having recorded thereon a program for executing the method in a computer.

Additional aspects will be set forth in part in the description which follows and, in part, will be apparent from the description, or may be learned by practice of the presented embodiments.

In accordance with an aspect of the disclosure, a method, performed by a device in a vehicle, of assisting with driving of the vehicle, includes: sensing, by using one or more sensors mounted on or in the vehicle, an ambient environment of a location of the vehicle at a time of the sensing; obtaining sensing information about the ambient environment based on the sensing of the ambient environment; comparing map information stored in the vehicle with the obtained sensing information; determining a map reliability of the map information based on a result of the comparing; and controlling, by the device, the driving of the vehicle based on the determined map reliability.

In accordance with another aspect of the disclosure, a non-transitory computer-readable recording medium having recorded thereon a program for performing the method is provided.

In accordance with another aspect of the disclosure, a device in a vehicle for assisting with driving of the vehicle, includes: a memory storing one or more instructions; at least one processor configured to execute the one or more instructions to: obtain sensing information about an ambient environment of a location of the vehicle sensed by one or more sensors mounted in or on the vehicle, compare map information stored in the vehicle with the obtained sensing information, determine a map reliability of the map information based on a result of the comparing, and control the driving of the vehicle based on the determined map reliability.

In accordance with another aspect of the disclosure, a method, performed by a device, of assisting with driving of a vehicle includes: obtaining sensing information about an ambient environment of a location of the vehicle sensed by one or more sensors of the vehicle; comparing map information for the vehicle with the obtained sensing information; determining a map reliability of the map information based on a result of the comparing; and determining control information for the vehicle based on the determined map reliability.

In accordance with another aspect of the disclosure, a non-transitory computer-readable recording medium having recorded thereon a program for executing the method in a computer is provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
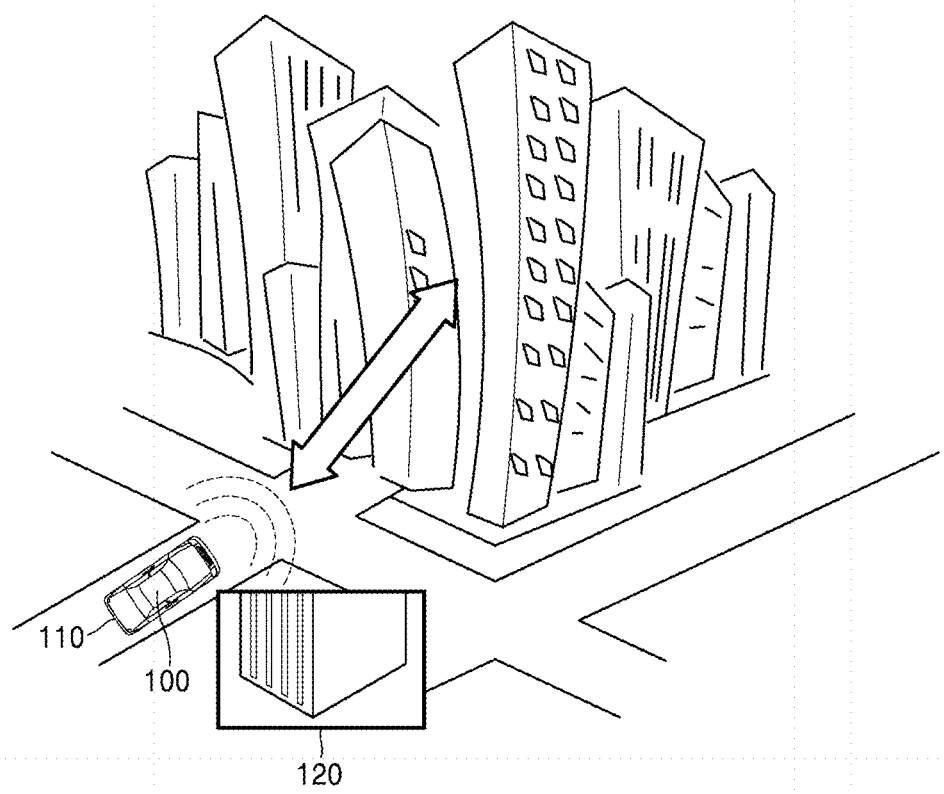
FIG. 1 is a diagram showing an example in which a device for assisting with driving of a vehicle operates.

Although the terms used in the following description are selected, as much as possible, from general terms that are widely used at present while taking into consideration the functions obtained in accordance with the embodiments, these terms may be replaced by other terms based on intentions of one of ordinary skill in the art, customs, emergence of new technologies, or the like. In a particular case, terms that are arbitrarily selected by the applicant may be used. In this case, the meanings of these terms may be described in or understood from corresponding parts of the embodiments. Therefore, it is noted that the terms used herein are construed based on practical meanings thereof and the whole content of this specification, rather than being simply construed based on names of the terms.

It will be understood that the terms "comprises," "comprising," "includes" and/or "including," when used herein, specify the presence of stated elements, but do not preclude the presence or addition of one or more other elements. The term "part" or "module" means a unit used to process at least one function and may be implemented as hardware, software, or a combination of hardware and software.

The expressions "A and/or B," "A or B," "at least one of A and B," "at least one of A or B," "one or more of A and B," and "one or more of A or B," as used herein, may include all possible combinations of the items that are enumerated together. For example, the term "A and/or B" or "at least one of A and B" may designate (1) at least one A, (2) at least one B, or (3) both of at least one A and at least one B.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein.

An autonomous vehicle may have external information detection and processing functions to recognize an ambient environment and autonomously determine a driving route and independently drive. The autonomous vehicle must be able to autonomously navigate to its destination by maintaining a distance from an obstacle present on the route without a driver's manipulation of a steering wheel, an acceleration pedal, or a brake, and adjusting a speed and a driving direction along a shape of a road. Basically, driving of the autonomous vehicle is based on map information stored in a database of the vehicle or provided from outside.

On the other hand, since the map information stored by the autonomous vehicle is based on collected spatial data, the accuracy of the map information may deteriorate due to errors occurring in a spatial data collection process. Therefore, a technology of determining the map reliability of the map information and controlling the autonomous vehicle using the determined map reliability may be particularly important. The map information with improved map reliability as provided according to various embodiments of the present disclosure may directly improve the functioning of the autonomous vehicle, e.g., by directly improving the location estimation performance of the autonomous vehicle.

FIG. 1 is a diagram showing an example in which a device 100 for assisting with driving of a vehicle 110 according to an embodiment operates.

The vehicle 110 shown in FIG. 1 may be an autonomous vehicle that has external information detection and processing functions and devices to determine an ambient environment, autonomously determine a driving route, and independently drive. The vehicle 110 may include or be communicatively coupled with the device 100. The autonomous vehicle may autonomously navigate to its destination by maintaining a distance from an obstacle present on the route without a driver's manipulation of a steering wheel, an acceleration pedal, or a brake, and adjusting a speed and a driving direction along a shape of a road. For example, the autonomous vehicle may accelerate on a straight road and decelerate on a curved road while changing the driving direction corresponding to a curvature of the road. At this time, the device 100 (for example, Advanced Driver Assistance Systems (ADAS)) for assisting with the driving of the vehicle 110 may use map information stored in a database or storage of the vehicle 110 or provided from outside. The map information may be information including accumulated landmark data such as road information, road marks, geography, topography and signs, construction, woods, etc.

The vehicle 110 according to an embodiment may be a vehicle for generating the map information or may be an autonomous vehicle using the map information.

When the vehicle 110 according to an embodiment is the autonomous vehicle using the map information, the map information may be provided from a memory in the vehicle 110 or from outside (e.g., a server) the vehicle 110. The vehicle 110 may search for a route from a predetermined location to another location using the provided map information and may drive on the found or determined route. The map information may refer to a map in which information of a road and an ambient topography is two-dimensionally (2D) or three-dimensionally (3D) constructed. For example, the map information may represent a road gradient, a curve curvature, a curve road elevation difference, a lane width, a structure, and the like in a 3D space. The map information may be generated in advance and stored in a database or storage of the vehicle 110. The map information may also be received previously or in real time during the driving of the vehicle 110 from an external server that manages the map information.

According to an embodiment, when the map information is provided from the external server, the vehicle 110 may communicate with the external server by being connected to a network through various types of wired and/or wireless communication methods. Specifically, the device 100 in the vehicle 110 may perform communication with the external server using a communicator including a long distance communication module or a short distance communication module. In the case of using a long distance communication module, the vehicle 110 may communicate with the external server according to communication standards such as IEEE, 3rd Generation (3G), 3rd Generation Partnership Project (3GPP), Long Term Evolution (LTE), Global Positioning System (GPS) communication, etc.

When the vehicle 110 according to an embodiment is the vehicle for generating the map information, the vehicle 110 may collect information about a region in which the vehicle 110 is currently driving. To collect the information, the device 100 in the vehicle 110 may sense an ambient environment 120 within a predetermined distance or sensing range from a current location of the vehicle 110 via a sensor attached to the vehicle 110.

Here, the ambient environment 120 may mean a predetermined region corresponding to the current location of the vehicle 110. For example, the ambient environment 120 may include a front region and/or a side region that may be scanned by the sensor with respect to the current location of the vehicle 110. Spatial information about the ambient environment 120 may already exist in the generated map information, or may be unknown information.

According to an embodiment, the device 100 may store sensing data obtained through the sensor in the database of the vehicle 110. For example, when the vehicle 110 drives in a location of which map information is to be generated, the device 100 may use a light detection and ranging (LiDAR) sensor to obtain point cloud information about the ambient environment 120 and store the point cloud information in the database.

According to an embodiment, the device 100 may transmit the sensing data obtained through the sensor to the external server over a network. For example, the device 100 may share the sensing data externally (i.e., to an outside) in a cloud-based crowd sourcing format.

The device 100 according to an embodiment may generate the map information based on the sensing data. The map information may be generated by performing a data matching algorithm regarding temporally continuous values of the sensing data. A specific method of generating a 3D map will be described below with reference to FIGS. 2 through 4.

According to an embodiment, since the generated map information is based on the spatial data sensed from the vehicle 110, a certain degree of errors may occur in a sensing process. Therefore, "map reliability" may be used as a parameter for quantifying how reliable the generated map information is. The map information with high reliability may be determined to have an error range of, for example, 10-20 cm and may be regarded as representing a more precise location of the ground or the structure (or surrounding structures and/or objects). Therefore, the map information with improved map reliability may directly improve a functioning of the vehicle 110, e.g., the location estimation performance and the driving stability of the vehicle 110.

The device 100 according to an embodiment may determine the map reliability of the map information provided to the vehicle 110. On the other hand, the map reliability may be determined not only inside the vehicle 110 but also via the external server. In this case, information about various conditions for determining the map reliability may be transmitted from the vehicle 110 to the external server over a network or other communication medium or method.

The map reliability according to an embodiment may be determined by identifying the number of driving repetitions of the current location, a difference between sensed ambient information and the stored map information, whether an accident occurs, whether a danger zone sign is identified, a covariance of six degrees of freedom (6-DOF), a danger degree of (e.g., the road curvature, an accident danger, etc.) the current location, and the like. However, a method of deriving the map reliability is not limited to the above-described examples. For example, the map reliability in one or more other embodiments may be derived in various ways described below. Specific methods of deriving the map reliability will be described below.

Information related to the map reliability according to an embodiment may be output through the vehicle 110 and provided to the driver. Furthermore or alternatively, the device 100 may control the driving of the vehicle 110 using the map reliability. Specifically, the device 100 may change a driving mode of the vehicle 110, adjust a driving speed of the vehicle 110, or update the map information stored in the vehicle 110 based on the map reliability.

For example, the device 100 may change the driving mode of the vehicle 110 from an autonomous driving mode to a manual driving mode in a section having a low map reliability. Alternatively (or additionally), the device 100 may adjust the driving speed of the vehicle 110 to a predetermined speed or lower in the section having the low map reliability. Also, for example, the device 100 may update the existing map information by using the sensing data obtained with respect to the ambient environment 120 in the section having the low map reliability.

Figure 2:
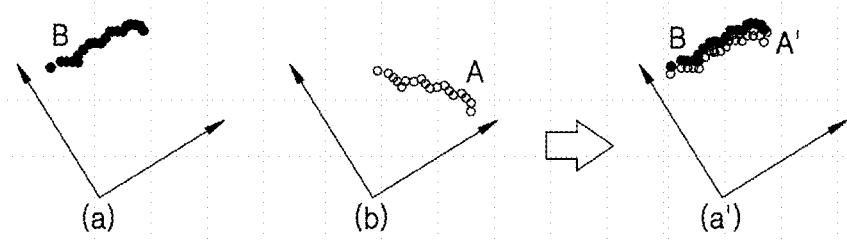
FIGS. 2 and 3 are diagrams for explaining a method, performed by a device, of generating map information according to an embodiment.
Figure 3:
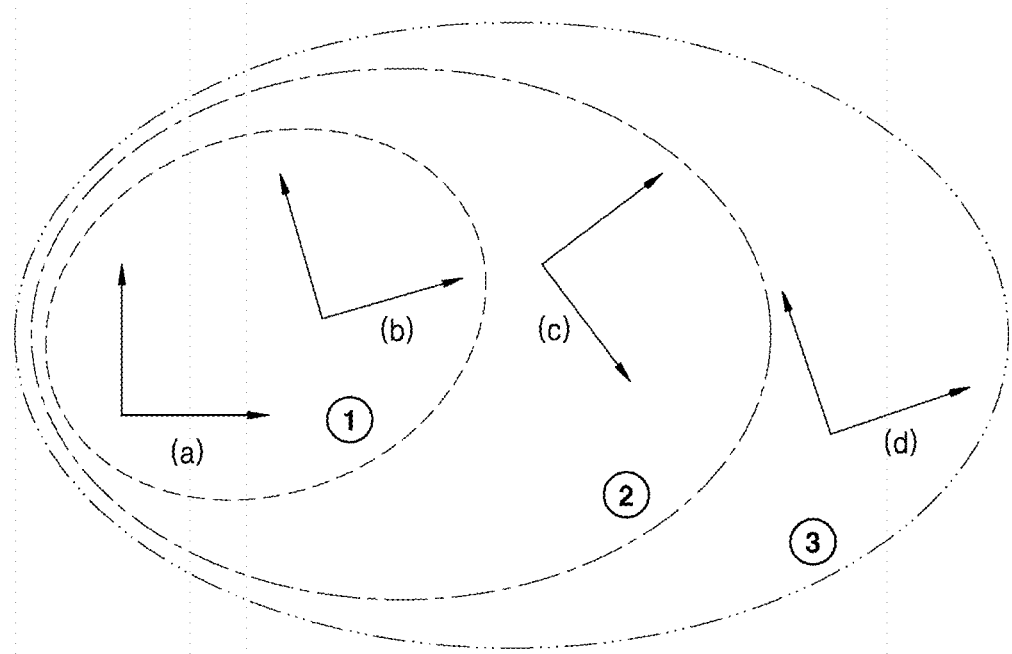

FIGS. 2 to 3 are diagrams for explaining a method, performed by a device, of generating map information according to an embodiment.

Localization and map-building processes may be performed simultaneously or substantially simultaneously in order for an autonomous vehicle to recognize its own location without prior knowledge of an ambient environment and to build information about the environment. This is referred to as simultaneous localization and mapping (SLAM) of the autonomous vehicle.

In order for the autonomous vehicle to perform map-building, information about the ambient environment is obtained. To this end, a sensor mounted on the autonomous vehicle may be used. The sensor may include at least one of a location sensor, an optical sensor, an environment sensor, a global positioning system (GPS), an inertial measurement unit (IMU), a RADAR sensor, a LiDAR sensor, an image sensor, etc. The image sensor may include at least one of a camera, a stereo camera, a monocamera, a wide angle camera, a 3D vision sensor, etc.

In order to obtain distance information between the autonomous vehicle and the ambient environment, the sensor may use a time-of-flight method of measuring a time taken for a signal emitted from a light emitter of the sensor to be reflected from an object and return to a light receiver. The sensor may calculate distance information from an intensity image of a signal (e.g., infrared rays) without a complicated calculation process, thereby obtaining the distance information in real time.

A method of creating a map of the ambient environment using the obtained distance information may include a method of creating the map using a landmark and a method of creating the map using a point cloud, but is not limited thereto.

For example, the method of creating the map using the landmark may be a method of recognizing a specific feature (e.g., landmark) or a boundary line of the ambient environment by using a camera and filling a voxel corresponding to distance information of the camera in accordance with location information of a current autonomous vehicle.

For example, the method of creating the map using the point cloud may be a technique of minimizing a distance difference between two point cloud data A and B sampled through a sensor as shown in FIG. 2 and may calculate a 3D rigid transformation (a translational transformation and rotation transformation) in which a distance error between the two 3D point cloud data A and B is minimized. The method of creating the map using the point cloud may relatively accurately match the two point cloud data by using the calculated 3D rigid transformation even when the location information of the autonomous vehicle is inaccurate, thereby improving the accuracy of a map.

As shown in FIG. 3, the method of creating the map using the point cloud may be a sequential map building method of finding corresponding points by sequentially accumulating point cloud data when the autonomous vehicle drives. The method includes processes (①→②→③) for matching the points. That is, the sequential map building method may be a method of building a map regarding the ambient environment of the autonomous vehicle in order of building ① a new map by matching sequentially accumulated two point cloud data (a) and (b), building ② a new map by matching the newly built map through the matching process of ① and subsequently accumulated point cloud data (c), and building ③ a new map by matching the newly built map through the matching process of ② and subsequently accumulated point cloud data (d).

Meanwhile, the map information generated through the above-described map building methods may be map information about a 3D space. Such 3D map information may include elements of 6-DOF. 6-DOF refers to all the operating elements used in the 3D space, i.e., X (horizontal), Y (vertical), Z (depth), pitch, yaw, and roll.

In the case of the 3D map information, the SLAM technique may provide location prediction information of an autonomous driving device and probability information about the location error. At this time, the provided probability information may be expressed in a covariance for 6-DOF. Since the covariance for 6-DOF represents a probability for an error of the built map, a region with a high covariance of 6-DOF in the generated map information may be interpreted as having a low map "accuracy," whereas a region with a low covariance of 6-DOF in the generated map information may be interpreted as having a high map "accuracy".

According to an embodiment, the covariance of 6-DOF may be used to evaluate the "map reliability" for quantifying how reliable the generated map information is. For example, the map reliability may be defined as an inverse number of the covariance of 6-DOF. Further, for example, when the covariance of 6-DOF exceeds a predetermined reference value, the location error may be determined to be large, and thus the map reliability may be evaluated to be low.

The device for assisting with driving of a vehicle according to an embodiment may generate a more accurate map by minimizing an influence due to an error occurring during a map building process considering the covariance for 6-DOF.

Figure 4:
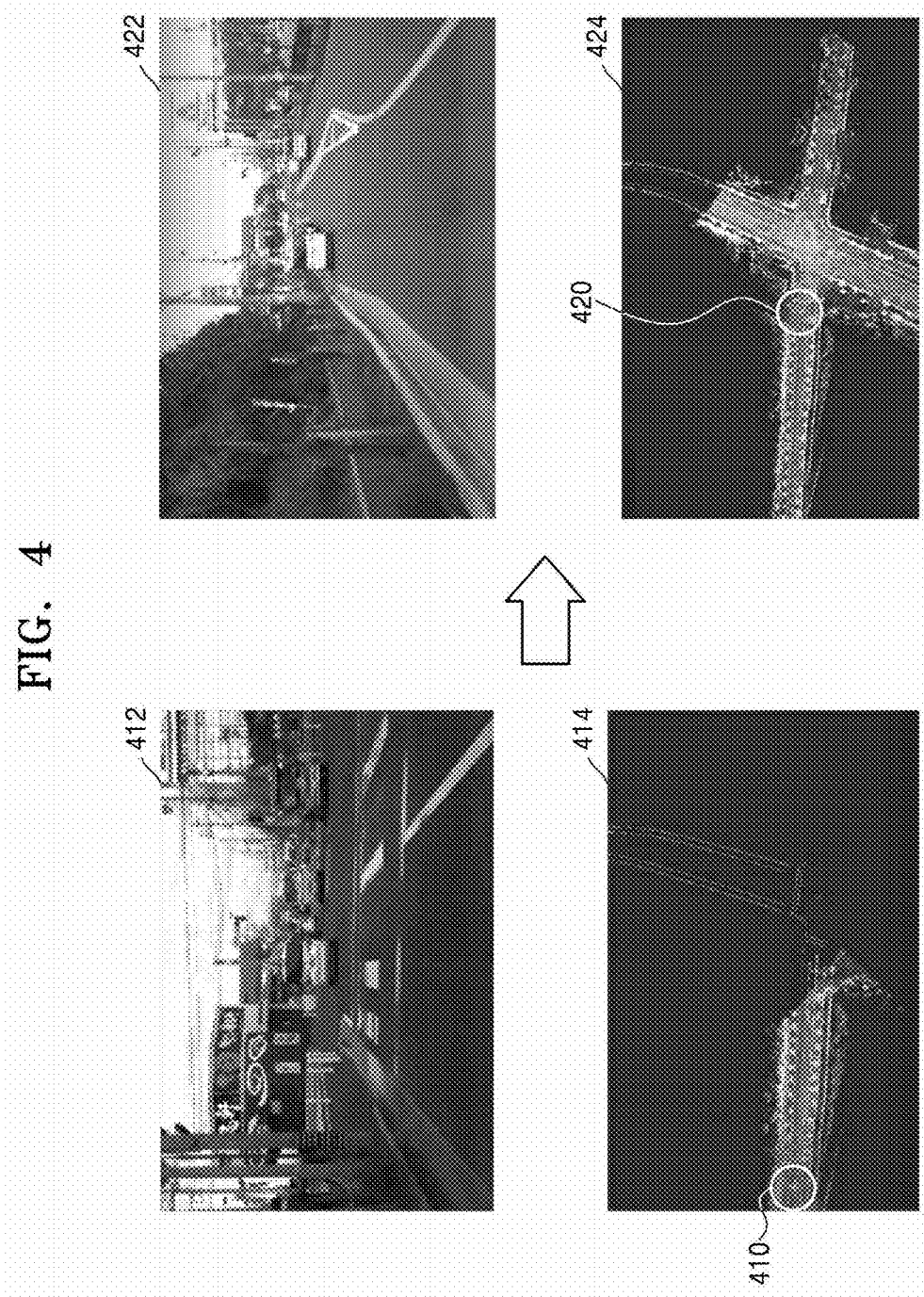
FIG. 4 is a diagram illustrating a process in which a device generates map information according to an embodiment.

FIG. 4 is a diagram illustrating a process in which a device generates map information 414 and 424 according to an embodiment.

A device for assisting with driving of a vehicle according to an embodiment may update the map information 414 and 424 by using the map building methods described above with reference to FIGS. 2 and 3. For example, in a state in which the vehicle that is currently driving is located in a first location 410, the device may configure the map information 414 about the first location 410 based on existing map information and sensing information about an ambient environment 412 and store the map information 414 in a database or storage of the vehicle. Thereafter, in a state in which the vehicle that is currently driving is located in a second location 420, the device may accumulate sensing information about an ambient environment 422 to configure the map information 424 about the second location 420 and store the map information 424 in the database or storage of the vehicle. As described above, the device may collect landmark data such as road information, road marks, geography, topography and signs, construction, woods, etc., on a route that the vehicle drives and store the landmark data in the database or storage.

Furthermore, the device according to an embodiment may update map information about a route generated in the past and stored in the database when the vehicle drives the route that the vehicle drove in the past. At this time, the map information may be updated based on a result obtained by determining map reliability of previously stored map information. The map reliability may be determined by at least one of identifying the number of driving repetitions of a current location, a difference between sensed ambient information and stored map information, whether an accident occurs, whether a danger zone sign is identified, a covariance of 6-DOF, a danger degree of (e.g., a road curvature, an accident danger, etc.) the current location, and the like. For example, the map information may be set to be updated when (e.g., only when) the accuracy of the map is improved by comparing the map information generated in the past and stored with the currently generated map information.

Figure 5:
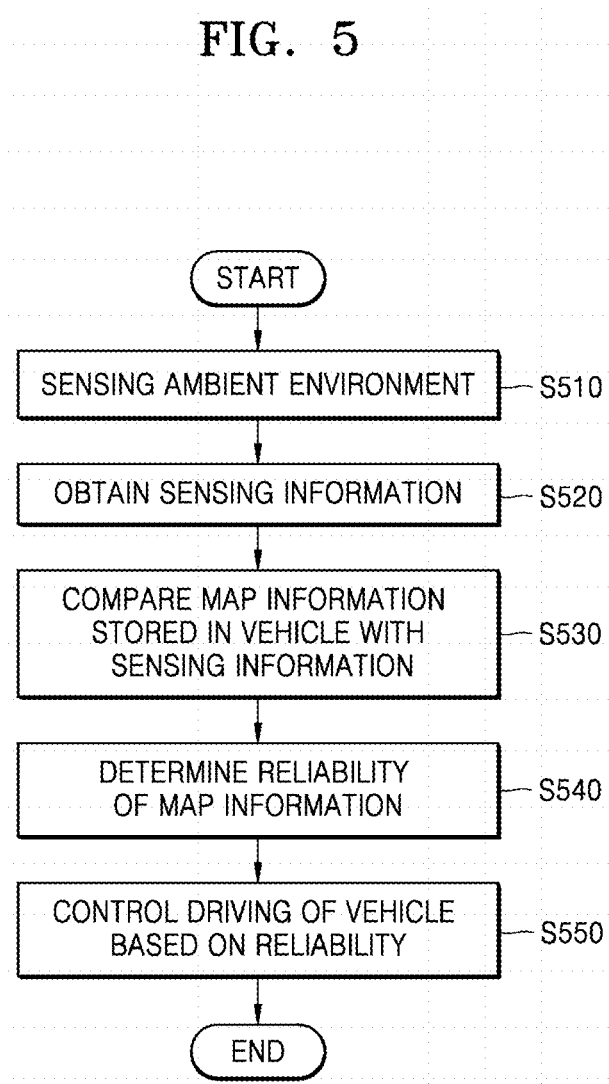
FIG. 5 is a flowchart of a method, performed by a device, of assisting with driving of a vehicle according to an embodiment.

FIG. 5 is a flowchart of a method, performed by the device 100, of assisting with driving of the vehicle 110 according to an embodiment.

In operation S510, the device 100 may use one or more sensors mounted on or in the vehicle 110 to sense the ambient environment 120 within a predetermined distance or a sensing range from a current location of the vehicle 110. For example, the device 100 may sense a front region and/or a side region that may be scanned by the sensor with respect to the current location of the vehicle 110. The sensor may include, but is not limited to, a GPS, an IMU, a RADAR sensor, a LiDAR sensor, an image sensor, etc.

In operation S520, the device 100 may obtain sensing information about the ambient environment 120. The sensing information according to an embodiment may include distance information between the vehicle 110 and the ambient environment 120 and may include a specific feature recognized from the ambient environment 120 or a boundary line or point cloud data on a 3D space.

In operation S530, the device 100 may compare map information stored in the vehicle 110 with the sensing information. The map information according to an embodiment may refer to information including accumulated landmark data such as road information, road marks, geography, topography and signs, building, woods, etc.

In operation S540, the device 100 may determine map reliability of the map information based on a comparison result obtained by comparing the map information stored in the vehicle 110 with the sensing information. According to an embodiment, when a difference between map information corresponding to the same region and the sensing information exceeds a predetermined reference value, a location error of the corresponding region may be evaluated to be large. Accordingly, the map reliability of the corresponding region may be determined to be low.

The map reliability according to an embodiment may be determined in various ways. For example, the map reliability may be determined by identifying at least one of a difference between sensed ambient information and stored map information, the number of driving repetitions of a current location, whether an accident occurs, whether a danger zone sign is identified, a covariance of 6-DOF, a danger degree of (e.g., a road curvature, an accident danger, etc.) the current location, and the like.

According to an embodiment, when the map reliability is determined based on the number of driving repetitions of the current location, the device 100 may identify information about the number of times that the vehicle 110 drove from or through the current location from driving record information stored in the vehicle 110 and determine the map reliability based on the identified information about the number of times that the vehicle 110 drove from or through the current location. At this time, it may be determined that the greater the number of times that the vehicle drive from or through the current location, the higher the map reliability.

According to an embodiment, when the map reliability is determined based on whether an accident occurs, the device 100 may identify whether there is a history of accidents occurring at the current location based on accident history information stored in the vehicle 110 or provided from an external server. It may be determined that the higher the number of accidents that occur at the current location, the lower the map reliability.

According to an embodiment, when the map reliability is determined based on whether a danger zone sign is identified, the device 100 may identify the danger zone sign from the map information stored in the vehicle 110 or from the information sensed from the sensor of the vehicle 110. When the danger zone sign is identified, it may be determined that the map information has a low map reliability.

According to an embodiment, when the map reliability is determined based on the covariance of 6-DOF, the device 100 may determine the map reliability based on covariance values of 6-DOF of a map region corresponding to the current location in the map information stored in the vehicle 110. For example, the map reliability may be defined as an inverse number of the covariance of 6-DOF. Also, for example, when the covariance of 6-DOF exceeds a predetermined reference value, a location error may be determined to be large such that the map reliability may be determined to be low.

According to an embodiment, when the map reliability is determined based on the danger degree of the current location, the device 100 may identify the danger degree (e.g., the road curvature, the accident danger, etc.) of the current location from the map information stored in the vehicle 110 and/or from the information sensed from the sensor of the vehicle 110. When it is determined that the danger degree of the current location is high, the map information may be determined to have a low map reliability.

In operation S550, the device 100 may control the driving of the vehicle 110 based on the determined map reliability. Examples in which the driving of the vehicle 110 is controlled based on the map reliability according to an embodiment will be described below with reference to FIGS. 6 to 10.

Figure 6:
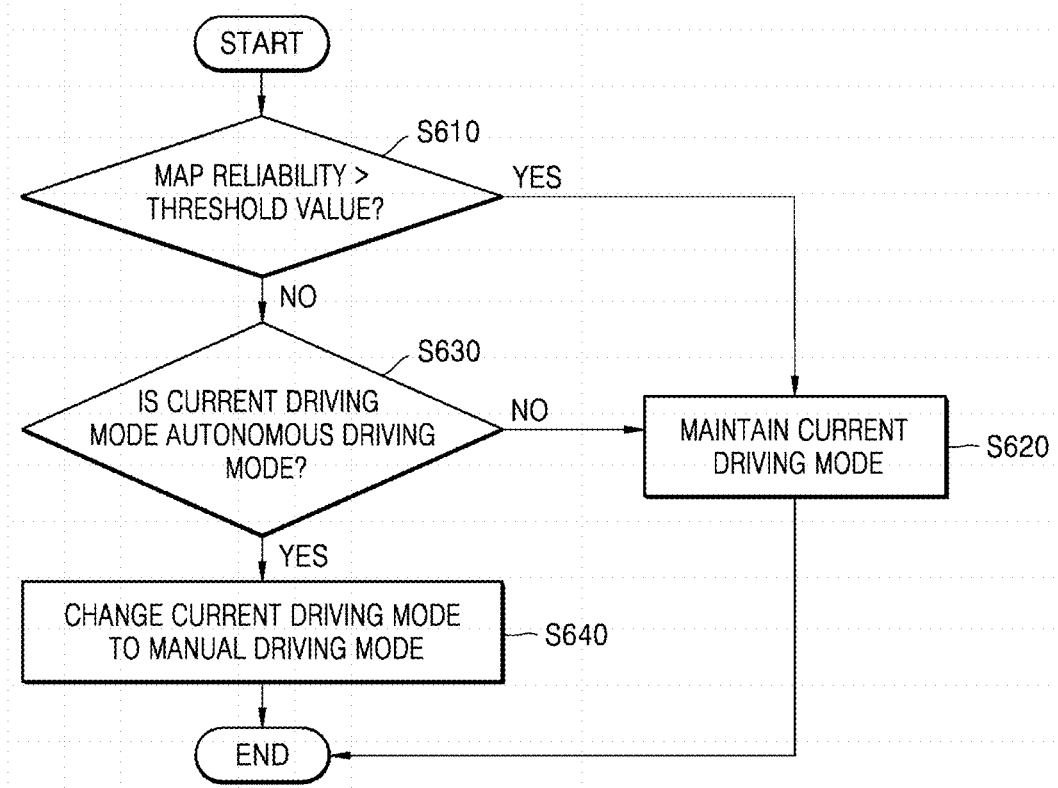
FIG. 6 is a flowchart of a method, performed by a device, of changing a driving mode of a vehicle based on map reliability according to an embodiment.

FIG. 6 is a flowchart of a method, performed by the device 100, of changing a driving mode of the vehicle 110 based on map reliability according to an embodiment.

A series of processes from a 'start' operation to an 'end' operation of FIG. 6 may be performed in operation S550 of FIG. 5.

In operation S610, the device 100 may determine whether the determined map reliability is equal to or less than a threshold value (or, according to another embodiment, simply less than a threshold value). The threshold value according to an embodiment may be a predetermined value as a reference value for determining whether to change the driving mode of the vehicle 110. However, the threshold value may be a value that may be set by a driver of the vehicle 110 and/or may be changed according to a current state of the vehicle 110.

In operation S610, when the map reliability is greater than the threshold value, the device 100 proceeds to operation S620, and when the map reliability is equal to or less than the threshold value, the device 100 proceeds to operation S630.

In operation S620, the device 100 may determine that the map reliability is greater than the threshold value and control the vehicle 110 to maintain a current driving mode of the vehicle 110. For example, when the map reliability is greater than the threshold value, a feature or a boundary of the ambient environment 120 of the vehicle 110 on map information stored in a database may be evaluated to be relatively accurate. In this case, the vehicle 110 may autonomously search for a route using previously stored map information and may determine that there is no difficulty in driving the found route. Therefore, the device 100 may not change the driving mode of the vehicle 110 in an autonomous driving mode to a manual driving mode (or to a semi-autonomous driving mode for controlling, for example, less functions (e.g., steering, acceleration, deceleration, etc.) of the vehicle 110 as compared to the autonomous driving mode).

In operation S630, when the map reliability is equal to or less than the threshold value, the device 100 may determine whether the current driving mode of the vehicle 110 is the autonomous driving mode. The map reliability that is equal to or less than the threshold value may mean that accuracy of the map information that the vehicle 110 is using is low.

Thus, in operation S630, when the current driving mode is the autonomous driving mode, the device 100 may change (or control to change via an instruction) the driving mode to the manual driving mode (or to a semi-autonomous driving mode). This is because, in a section in which the reliability of the map information is low, a passive driving mode in which the driver watches the front of the vehicle 110 may enable stable driving as compared to the autonomous driving mode in which the driver is dependent on the map information.

However, even though the map reliability is equal to or less than the threshold value, when the current driving mode of the vehicle 110 is the manual driving mode, the device 100 may not change the driving mode. Accordingly, when the current driving mode is the manual driving mode in operation S630, the device 100 may proceed to operation S620 again to allow the vehicle 110 to maintain the current driving mode.

According to another embodiment, when the current driving mode of the vehicle 110 is a semi-autonomous driving mode and the map reliability is equal to or less than a threshold value (different from or the same as a threshold value for transitioning out of the autonomous driving mode to the semi-autonomous driving mode), the device 100 may change (or control to change via an instruction) the driving mode to the manual driving mode.

Figure 7:
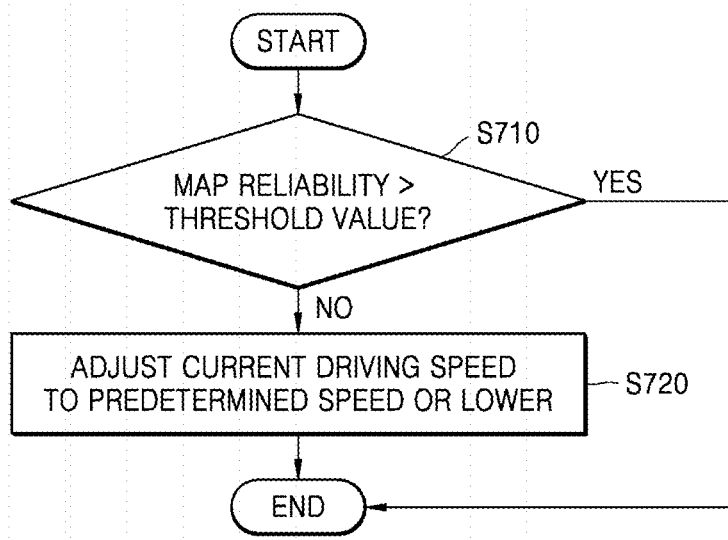
FIG. 7 is a flowchart of a method, performed by a device, of adjusting a driving speed of a vehicle based on map reliability according to an embodiment.

FIG. 7 is a flowchart of a method, performed by the device 100, of adjusting a driving speed of the vehicle 110 based on map reliability according to an embodiment.

A series of processes from a 'start' operation to an 'end' operation of FIG. 7 may be performed in operation S550 of FIG. 5.

In operation S710, the device 100 may determine whether the determined map reliability is equal to or less than a threshold value (or, according to another embodiment, simply less than a threshold value). The threshold value according to an embodiment may be a predetermined value as a criterion for determining whether to adjust the driving speed of the vehicle 110. However, the threshold value may be a value that may be set by a driver of the vehicle 110 and/or may be changed according to a current state of the vehicle 110.

In operation S710, when the map reliability is greater than the threshold value, the device 100 may not perform any further operations. For example, the device 100 may maintain a current driving speed of the vehicle 110.

In operation S710, when the map reliability is equal to or less than the threshold value, the device 100 may proceed to operation S720.

In operation S720, when the map reliability is equal to or less than the threshold value, this indicates that that the accuracy or reliability of map information that the vehicle 110 is using is low. Accordingly, the device 100 may adjust the current driving speed to a predetermined speed or lower for securing the driving stability of the vehicle 110.

Figure 8:
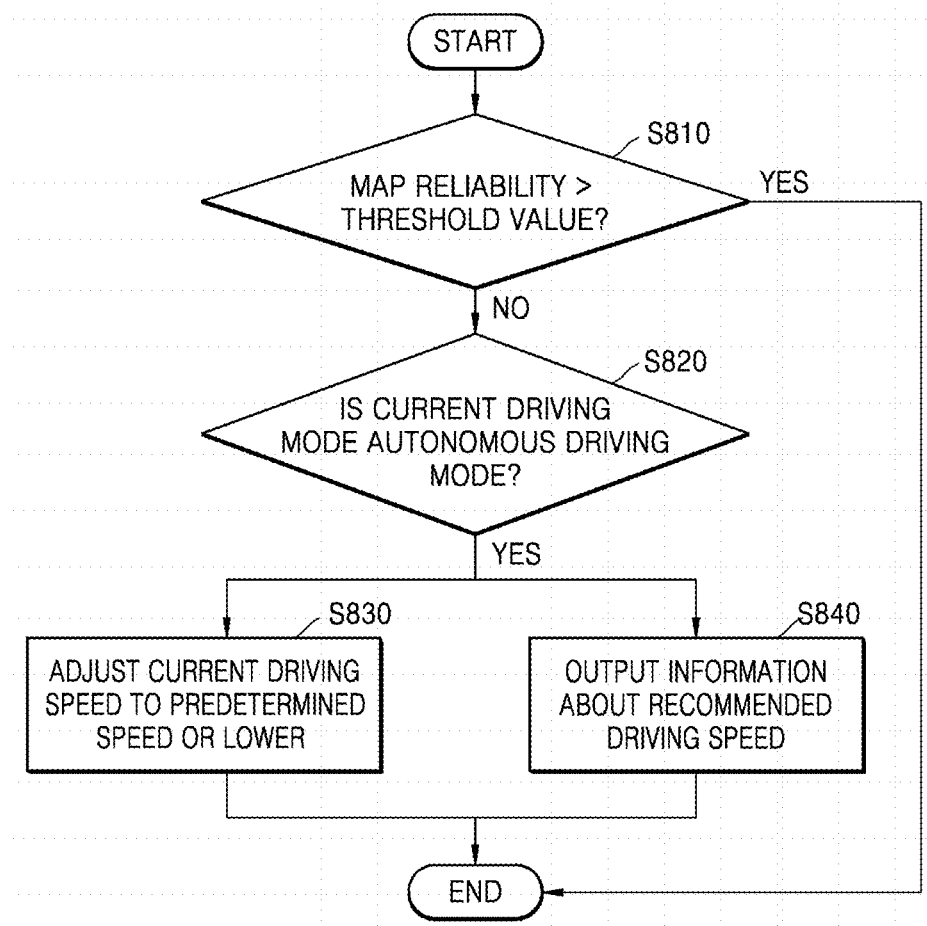
FIG. 8 is a flowchart of a method, performed by a device, of adjusting a driving speed of a vehicle based on map reliability according to another embodiment.

FIG. 8 is a flowchart of a method, performed by the device 100, of adjusting a driving speed of the vehicle 110 based on map reliability according to another embodiment.

A series of processes from a 'start' operation to an 'end' operation of FIG. 8 may be performed in operation S550 of FIG. 5.

In operation S810, the device 100 may determine whether the determined map reliability is equal to or less than a threshold value (or, according to another embodiment, simply less than a threshold value). The threshold value according to an embodiment may be a predetermined value as a criterion for determining whether to adjust the driving speed of the vehicle 110. However, the threshold value may be a value that may be set by a driver of the vehicle 110 and/or may be changed according to a current state of the vehicle 110.

In operation S810, when the map reliability is greater than the threshold value, the device 100 may not perform any further operations. For example, the device 100 may maintain a current driving speed of the vehicle 110.

In operation S810, when the map reliability is equal to or less than the threshold value, the device 100 may proceed to operation S820.

In operation S820, when the map reliability is equal to or less than the threshold value, the device 100 may determine whether the current driving mode of the vehicle 110 is an autonomous driving mode. The map reliability that is equal to or less than the threshold value may mean that the accuracy of map information that the vehicle 110 is using is low.

In operation S830, when the current driving mode is the autonomous driving mode, the device 100 may adjust the driving speed to a predetermined speed or lower. This is because, instead of lowering the dependence on a map, in a section where the map reliability is low, it is safe for the device 100 to recognize the ambient environment 120 sufficiently and drive at such a speed as to maintain a distance from an obstacle present on a route.

In operation S840, when the current driving mode is a manual driving mode, the device 100 may output information about a recommended driving speed through an output unit of the vehicle 110. In the section where the map reliability is low, the driver may be alerted by providing the driver with a notification message about the recommended driving speed.

Figure 9:
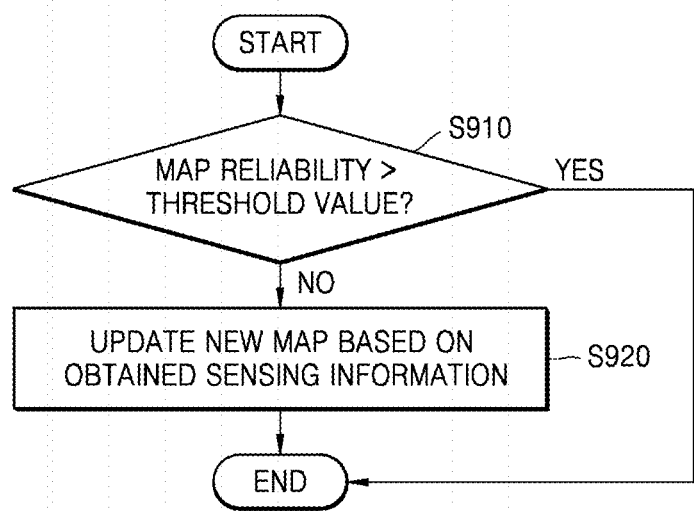
FIG. 9 is a flowchart of a method, performed by a device, of updating map information based on map reliability according to an embodiment.

FIG. 9 is a flowchart of a method, performed by a device, of updating map information based on map reliability according to an embodiment.

A series of processes from a 'start' operation to an 'end' operation of FIG. 9 may be performed in operation S550 of FIG. 5.

In operation S910, the device 100 may determine whether the determined map reliability is equal to or less than a threshold value. The threshold value according to an embodiment may be a predetermined value as a criterion for determining whether to update the stored map information to new or updated map information. However, the threshold value may be a value that may be set by a driver of the vehicle 110 and/or may be changed according to a current state of the vehicle 110.

In operation S910, when the map reliability is greater than the threshold value, the device 100 may not perform any further operations. For example, the currently provided map information may be used for the driving of the vehicle 110.

In operation S910, when the map reliability is equal to or less than the threshold value, the device 100 may proceed to operation S920.

In operation S920, when the map reliability is equal to or less than the threshold value, this indicates that the accuracy or reliability of map information that the vehicle 110 is using is low. Accordingly, the device 100 may update the currently provided map information to the new or updated map information for securing the driving stability of the vehicle 110. At this time, according to a map information generation method (for example, an SLAM algorithm) described above with reference to FIGS. 2 and 3, the device 100 may generate the new or updated map information based on sensing information obtained with respect to the ambient environment 120. For a subsequent update, the generated new map information may be stored in a memory of the vehicle 110.

Figure 10:
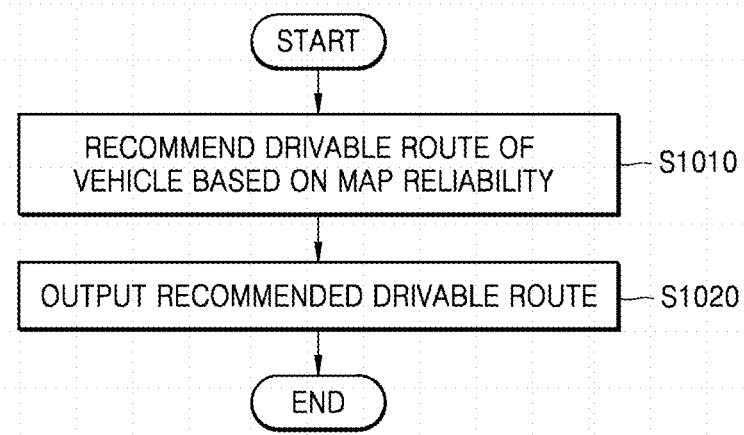
FIG. 10 is a flowchart of a method, performed by a device, of recommending a drivable route of a vehicle based on map reliability according to an embodiment.

FIG. 10 is a flowchart of a method, performed by the device 100, of recommending a drivable route of the vehicle 110 based on map reliability according to an embodiment.

A series of processes from a 'start' operation to an 'end' operation of FIG. 10 may be performed in operation S550 of FIG. 5.

In operation S1010, the device 100 may recommend the drivable route of the vehicle 110 based on the determined map reliability. The drivable route may be generated based on provided map information. The drivable route according to an embodiment may be recommended to drive a route with the highest map reliability among various routes on a map. For example, when there is a variety of drivable routes to the same destination, the device 100 may recommend an optimum drivable route considering a cost function of at least one of a driving distance of each drivable route, a map reliability for each drivable route, and the current state of the vehicle 110.

The device 100 according to an embodiment may receive a determination as to whether to recommend the drivable route from the driver through an input unit or device. For example, the device 100 may turn on or off a driving route recommendation function based on the map reliability through a user input to the input unit.

In operation S1020, the device 100 may output the recommended drivable route through an output unit (e.g., display).

Figure 11:
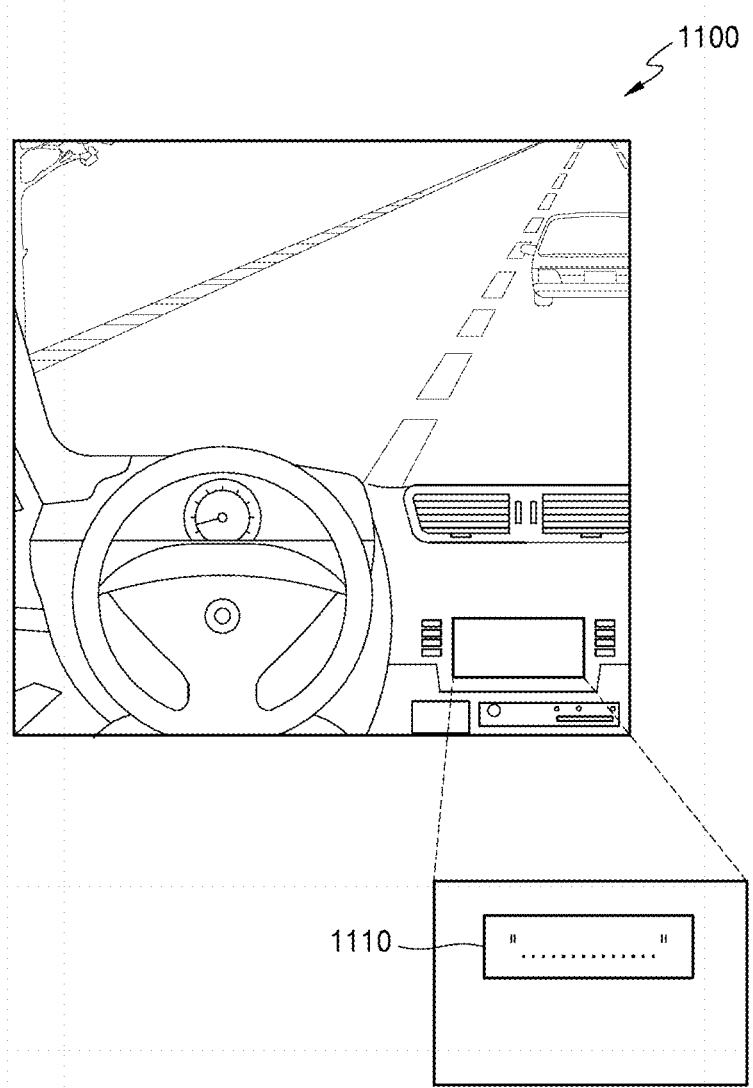
FIG. 11 is a diagram illustrating an output unit according to an embodiment.

FIG. 11 is a diagram illustrating an output unit (e.g., display) according to an embodiment.

Referring to FIG. 11, a vehicle 1100 driving in a space where map information is provided is shown. The vehicle 1100 of FIG. 11 may correspond to the vehicle 110 of FIG. 1.

The map information according to an embodiment may be stored in advance in a memory of the vehicle 1100 and/or may be provided from an external server via a network or by various types of wired and wireless communication methods. According to an embodiment, the output unit of the vehicle 1100 may output various information related to driving of the vehicle 1100.

According to an embodiment, the output unit of the vehicle 1100 may output information about map reliability of a predetermined region corresponding to a current location. For example, in a section in which the map reliability is low, a notification message 1110 warning that reliability of the provided map information is low may be output through the output unit.

According to an embodiment, the output of the vehicle 1100 may output the notification message 1110 indicating that a driving speed of the vehicle 1100 is adjusted. For example, in the section in which the map reliability is low, the notification message 1110 indicating that the driving speed of the vehicle 1100 is automatically reduced to a predetermined speed or lower may be output. When a driving mode of the vehicle 1100 is a manual driving mode, the vehicle 1100 may alert a driver by outputting the notification message 1110 regarding a recommended driving speed. According to another embodiment, the notification message 1110 may be alternatively or additionally output via another notification device (e.g., a speaker, vibration of a component of the vehicle such as a steering wheel or seat, etc.).

According to an embodiment, the output unit of the vehicle 1100 may output the notification message 1110 informing that update of the map information is to be performed.

The notification message 1110 according to an embodiment may be output in various forms as well as a warning phrase.

The output unit according to an embodiment may visually output various information processed, generated, and received by the vehicle 1100. However, in addition to the above-described methods, the output unit may output a head-up display (HUD) notification message to a visible zone of the driver by using a projector and a plurality of mirrors or may output a notification message to a central information display (CID). Also, the output unit may output a warning sound through a speaker to provide a notification message to the driver. Accordingly, the embodiment in which the output unit outputs the notification message 1110 is not limited to the above-described configuration and may output the notification message 1110 through various known or unknown methods.

Figure 12:
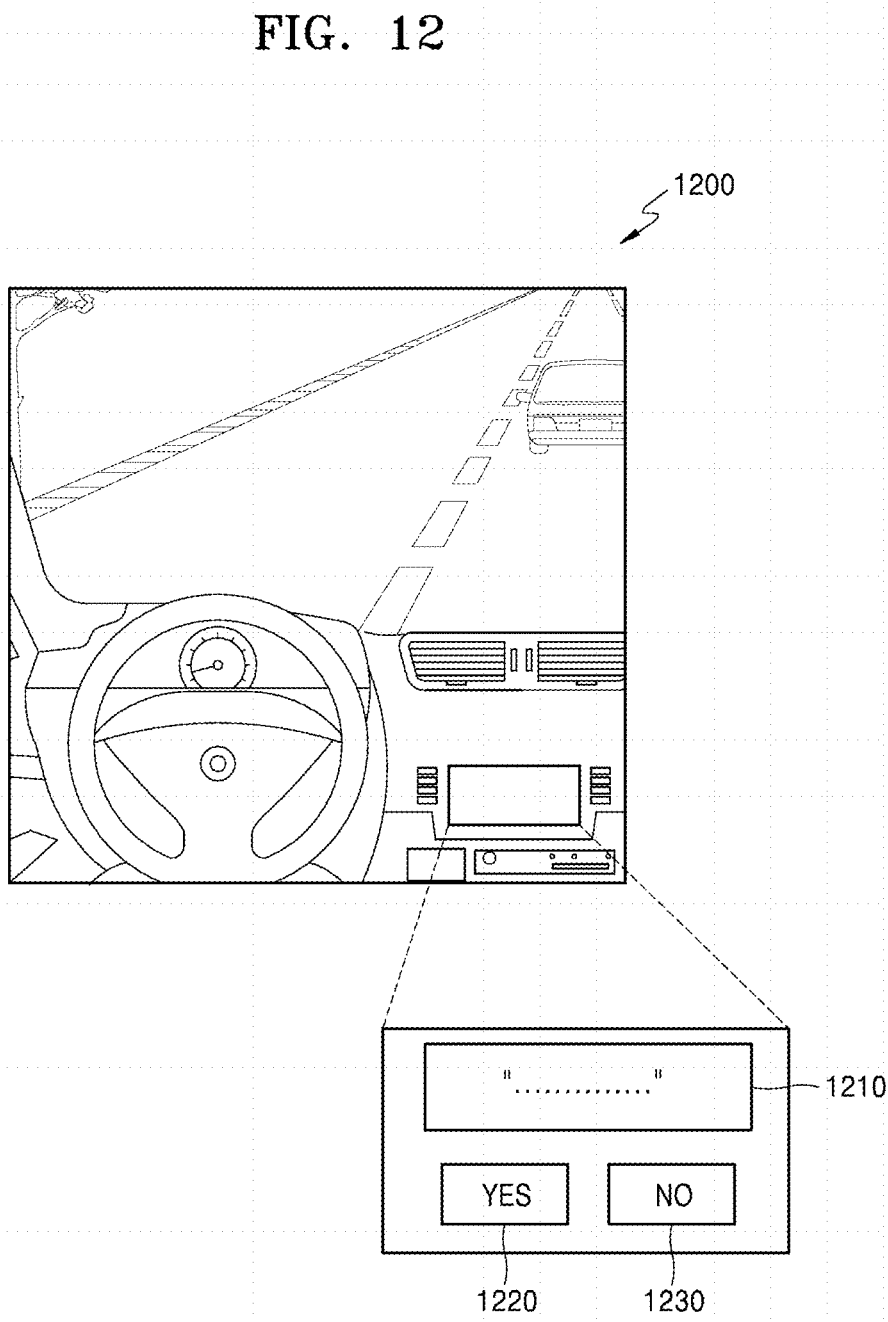
FIG. 12 is a diagram illustrating an output unit according to another embodiment.

FIG. 12 is a diagram illustrating an output unit (e.g., display) according to another embodiment.

Referring to FIG. 12, a vehicle 1200 driving in a space where map information is provided is shown. The vehicle 1200 of FIG. 12 may correspond to the vehicle 110 of FIG. 1.

According to an embodiment, the output unit of the vehicle 1200 may output a notification message 1210 confirming whether to change a driving mode. For example, when the driving mode of the vehicle 1200 is an autonomous driving mode in a section where map reliability is low, the vehicle 1200 may output the notification message 1210 indicating that the driving mode is changed to a manual driving mode through the output unit. When a map reliability value is greater than a threshold value or a current driving mode is the manual driving mode, an event in which the notification message 1210 is output may not occur.

When the output unit of the vehicle 1200 according to an embodiment outputs the notification message 1210 confirming whether to change the driving mode, an input unit of the vehicle 1200 may receive determinations 1220 and 1230 as to a change of the driving mode from the driver.

According to an embodiment, the output of the vehicle 1200 may output the notification message 1210 confirming whether to update the map information. When the output unit of the vehicle 1200 according to an embodiment outputs the notification message 1210 confirming whether to update the map information, the input unit of the vehicle 1200 may receive the determinations 1220 and 1230 as to whether to update the map information from the driver.

The input unit according to an embodiment may receive a user input through a joystick, a touch screen, a touch pad, a button, a voice, and the like, and is not limited to the above example.

Figure 13:
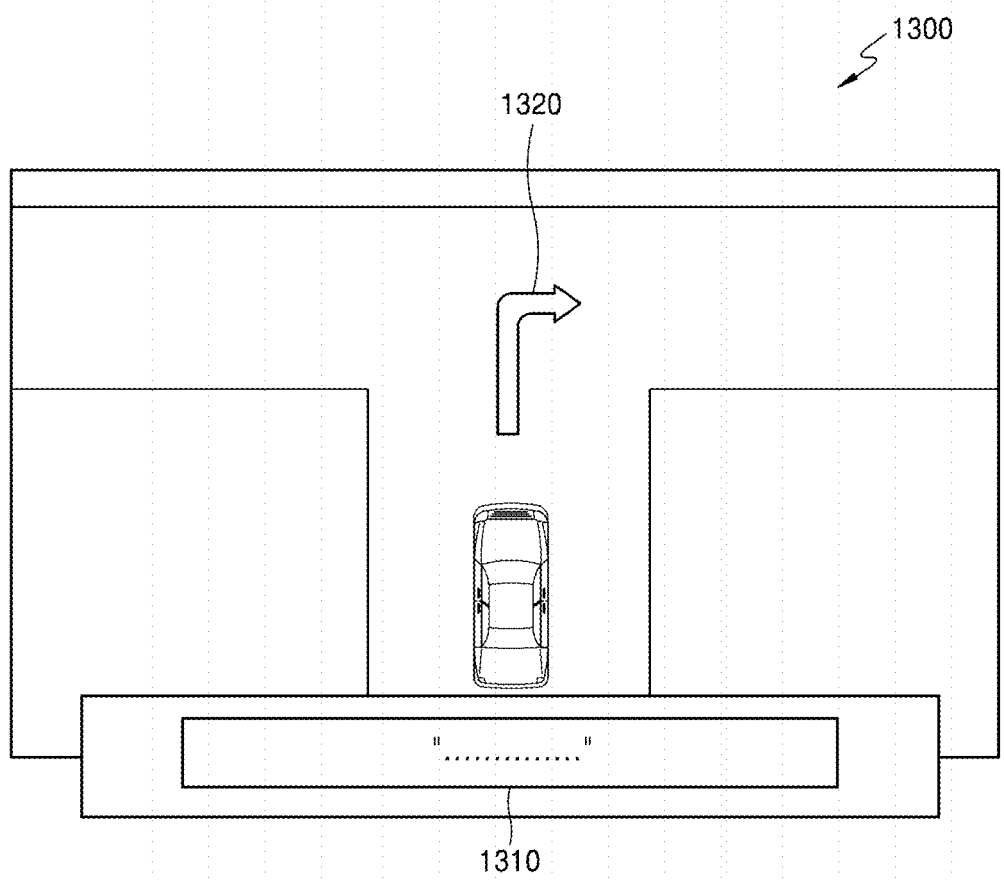
FIG. 13 is a diagram illustrating an output unit that outputs a recommended drivable route according to an embodiment.

FIG. 13 is a diagram illustrating an output unit 1300 (e.g., display) that outputs a recommended drivable route according to an embodiment.

Referring to FIG. 13, the output unit 1300 in a vehicle is shown. The output unit 1300 may output visual images and/or notification sounds in various forms such as a display, a 3D display, a head-up display, and the like.

According to an embodiment, the output unit 1300 of the vehicle may output notification messages 1310 and 1320 indicating the recommended drivable route. Here, the recommended drivable route may represent a route with the highest map reliability determined from among various routes on a map.

According to an embodiment, when a driving mode of the vehicle is an autonomous driving mode, the vehicle may output the notification messages 1310 and 1320 indicating the recommended drivable route to the output unit 1300 and may drive on the recommended drivable route at the same or substantially same time.

According to an embodiment, when the driving mode of the vehicle is a manual driving mode, the output unit 1300 may suggest or instruct a driving direction or route of a driver by outputting the notification messages 1310 and 1320 indicating the recommended drivable route.

Figure 14:
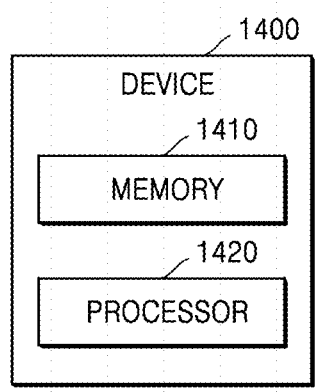
FIG. 14 is a block diagram of a device for assisting with driving of a vehicle according to an embodiment.

FIG. 14 is a block diagram of a device 1400 for assisting with driving of a vehicle according to an embodiment.

The device 1400 of FIG. 14 may correspond to the device 100 of FIG. 1.

According to an embodiment, the device 1400 may include a memory 1410 and a processor 1420. The device 1400 shown in FIG. 14 includes components related to the present embodiment. It will be understood by those of ordinary skill in the art that other general-purpose and special-purpose components than the components shown in FIG. 14 may further be included.

The memory 1410 may include at least one of a magnetic disk drive, an optical disk drive, a flash memory, etc. Alternatively or additionally, the memory 1410 may include a portable universal serial bus (USB) data storage device. The memory 1410 may store system software for executing functions related to the present disclosure. The system software for executing the functions related to the present disclosure may be stored on a portable storage medium.

The processor 1420 may determine a map reliability regarding map information stored in a database of the vehicle. Various methods of determining the map reliability are the same as or similar to those described above with reference to FIG. 5, and thus redundant descriptions thereof are omitted below.

Also, the processor 1420 may control driving of the vehicle based on the determined map reliability. The method of controlling the driving of the vehicle based on the determined map reliability is the same as or similar to that described above with reference to FIGS. 6 to 10, and thus a detailed description thereof is omitted.

Figure 15:
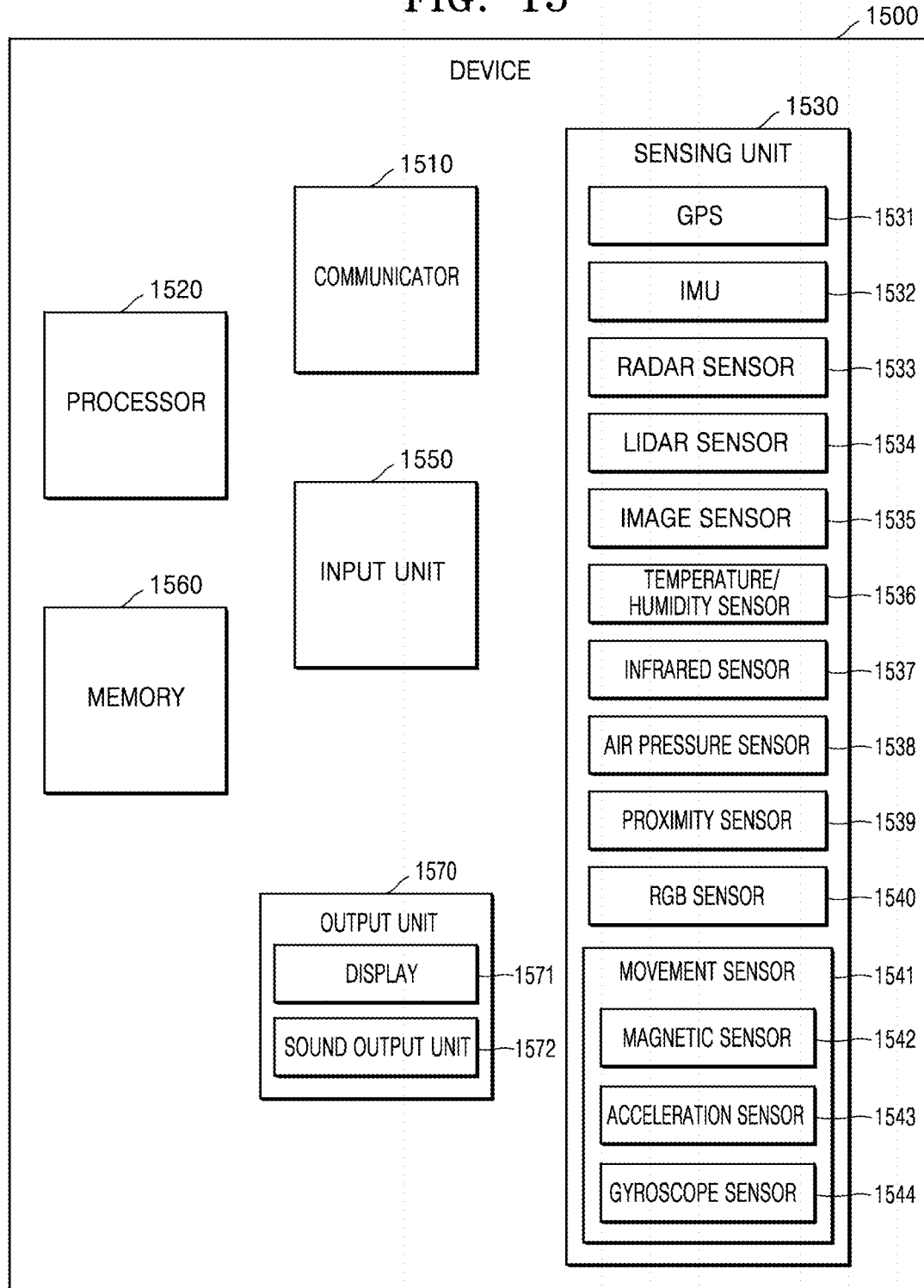
FIG. 15 is a block diagram of a device for assisting with driving of a vehicle according to another embodiment.

FIG. 15 is a block diagram of a device 1500 for assisting with driving of a vehicle according to another embodiment.

The device 1500 of FIG. 15 may correspond to the device 100 of FIG. 1.

The device 1500 may include a communicator 1510, a processor 1520, a sensing unit 1530 (e.g., one or more sensors), an input unit 1550 (e.g., input device), a memory 1560, and an output unit 1570 (e.g., display or interface to output to a display or display device).

The communicator 1510 may include at least one antenna for wirelessly communicating with another device. For example, the communicator 1510 may be used to communicate with a cellular network or other wireless protocols and systems wirelessly via Wi-Fi or Bluetooth. The communicator 1510 controlled by the processor 1520 may transmit and receive wireless signals. For example, the processor 1520 may execute programs included in the memory 1560 to allow the communicator 1510 to transmit and receive wireless signals to and from the cellular network.

The processor 1520 may generally control the communicator 1510, the sensing unit 1530, the input unit 1550, the memory 1560, and the output unit 1570 by executing programs or instructions stored in the memory 1560.

The sensing unit 1530 may include a plurality of sensors configured to sense information about an environment in which the vehicle is located and may include one or more actuators configured to modify locations and/or orientations of the sensors. For example, the sensing unit 1530 may include at least one of a GPS 1531, an IMU 1532, a RADAR sensor 1533, a LiDAR sensor 1534, and an image sensor 1535. According to an embodiment, the image sensor 1535 may include at least one of a camera, a stereo camera, a mono camera, a wide angle camera, a 3D vision sensor, a charge-coupled device, a complementary metal-oxide-semiconductor, a photosensor area, etc. Also, the sensing unit 1530 may include at least one of a temperature/humidity sensor 1536, an infrared sensor 1537, an air pressure sensor 1538, a proximity sensor 1539, and an RGB sensor 1540, but is not limited thereto. The sensing unit 1530 may also be configured as a combination of the image sensor 1535 and the RADAR sensor 1533 or a combination of the image sensor 1535 and the LiDAR sensor 1534. A function of each sensor may be intuitively deduced from the name by one of ordinary skill in the art, and thus a detailed description thereof is omitted.

Also, the sensing unit 1530 may include a movement sensor 1541 capable of sensing a movement of the vehicle. The movement sensor 1541 may include at least one of a magnetic sensor 1542, an acceleration sensor 1543, and a gyroscope sensor 1544.

The GPS 1531 may be a sensor configured to estimate a geographic location of the vehicle. That is, GPS 1531 may include a transceiver configured to estimate the location of the vehicle relative to the earth.

The IMU 1532 may be a combination of sensors configured to sense location and orientation changes of the vehicle based on the inertial acceleration. For example, the combination of sensors may include accelerometers and gyroscopes.

The RADAR sensor 1533 may be a sensor configured to use wireless signals to sense objects within the environment in which the vehicle is located. Also, the RADAR sensor 1533 may be configured to sense speed and/or directions of the objects.

The LiDAR sensor 1534 may be a sensor configured to use laser to sense the objects within the environment in which the vehicle is located. More specifically, the LiDAR sensor 1534 may include a laser light source and/or a laser scanner configured to emit a laser and a detector configured to detect reflection of the laser. The LiDAR sensor 1534 may be configured to operate in a coherent (e.g., using heterodyne detection) or incoherent detection mode.

The image sensor 1535 may include at least one of a still camera and a video camera configured to record an environment outside the vehicle. For example, the image sensor 1535 may include multiple cameras. The multiple cameras may be located at multiple locations inside and outside of the vehicle.

The memory 1560 may include at least one of a magnetic disk drive, an optical disk drive, a flash memory, a portable USB data storage device, etc. The memory 1560 may store system software for executing or implementing examples related to the present disclosure. The system software for executing or implementing the examples related to the present disclosure may be stored on a portable storage medium.

The input unit 1550 refers to a unit or device (e.g., circuitry) that inputs data or commands for controlling the vehicle. For example, the input unit 1550 may include a key pad, a dome switch, a touch pad (contact type capacitance type, pressure type resistive type, infrared ray detection type, surface ultrasonic wave conduction type, an integral tension measurement type, a piezo effect type, etc.), a jog wheel, a jog switch, and the like, but is not limited thereto. Also, input unit 1550 may include a microphone that may be configured to receive audio (e.g., voice commands) from a passenger of the vehicle.

The output unit 1570 may output at least one of an audio signal and a video signal and may include a display 1571, a sound output unit 1572 (e.g., speaker or audio output interface such as a headphone input jack), and a vibrating device.

The display 1571 may include at least one of a liquid crystal display, a thin film transistor-liquid crystal display, an organic light-emitting diode (OLED) display, an active-matrix OLED (AMOLED), a quantum dot display, a flexible display, a 3D display, and an electrophoretic display. Depending on the implementation of the output unit 1570, the output unit 1570 may include two or more displays 1571.

The sound output unit 1572 may output audio data received from the communicator 1510 or stored in the memory 1560. The sound output unit 1572 may also include a speaker, a buzzer, and the like.

The vibrating device may generate physical vibration using electric energy.

The input unit 1550 and the output unit 1570 may include a network interface and may be implemented as a touch screen.

Figure 16:
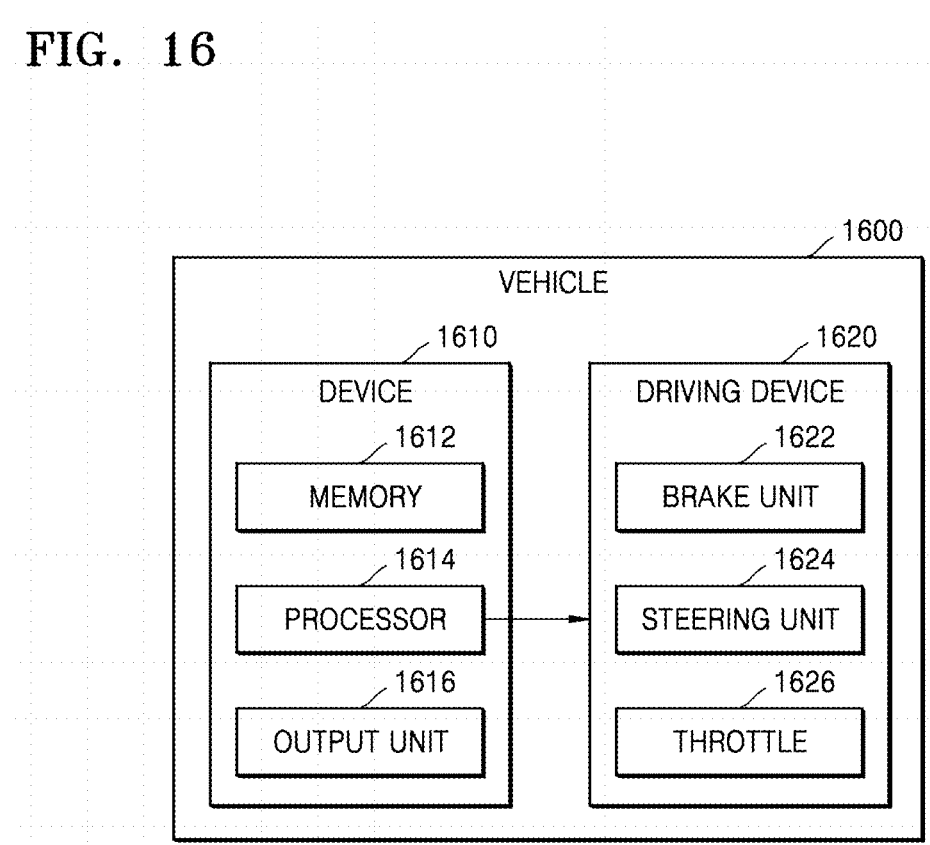
FIG. 16 is a block diagram of a vehicle according to an embodiment.

FIG. 16 is a block diagram of a vehicle 1600 according to an embodiment.

The vehicle 1600 and a device 1610 of FIG. 16 may correspond to the vehicle 110 and the device 100 of FIG. 1.

According to an embodiment, the vehicle 1600 may include the device 1610 and a driving device 1620. The vehicle 1600 shown in FIG. 16 includes components related to the present embodiment. It is understood that other components (e.g., general-purpose components) than the components shown in FIG. 16 may be further included.

The device 1610 may include a memory 1612, a processor 1614, and an output unit 1616. The memory 1612, the processor 1614 and the output unit 1616 are respectively the same as or similar to the memory 1560, the processor 1520 and the output unit 1570 of FIG. 15, and thus redundant descriptions of operations thereof are omitted.

The driving device 1620 may include a brake unit 1622, a steering unit 1624, and a throttle 1626.

The steering unit 1624 may be a combination of mechanisms configured to adjust an orientation of the vehicle 1600.

The throttle 1626 may be a combination of mechanisms configured to control operating speeds of an engine and a motor to control a speed of the vehicle 1600. Also, the throttle 1626 may control an amount of a mixture gas of fuel air flowing into the engine and the motor by adjusting an opening amount of the throttle 1626 and control power and thrust by adjusting the opening amount of the throttle 1626.

The brake unit 1622 may be a combination of mechanisms configured to decelerate the vehicle 1600. For example, the brake unit 1622 may use friction to reduce a speed of a wheel and tires.

Figure 17:
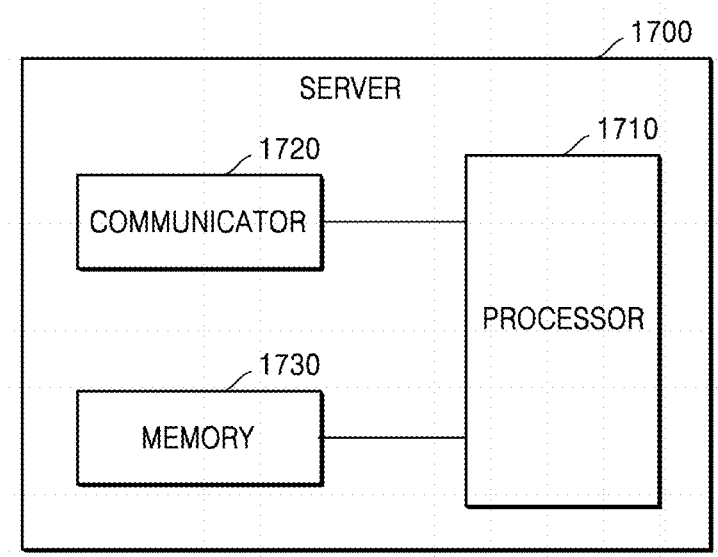
FIG. 17 is a block diagram of a server according to an embodiment.

FIG. 17 is a block diagram of a server 1700 according to an embodiment.

Referring to FIG. 17, the server 1700 may include a communicator 1720, a memory 1730, and a processor 1710.

The communicator 1720 may perform wired/wireless communication with another device or a network. To this end, the communicator 1720 may include a communication module supporting at least one of various wired/wireless communication methods. For example, the communication module may be in the form of a chipset.

The communicator 1720 may be connected to an external device located outside the server 1700 to transmit and receive signals or data. The server 1700 may be connected to the external device through the communicator 1720 and transfer the signals or the data received from the external device to the processor 1710 or transmit signals or data generated by the processor 1710 to the external device. In an embodiment, the communicator 1720 may receive a request for transmission of map information relating to a predetermined region corresponding to a current location of a vehicle from the vehicle and may transmit the map information about the predetermined region to the vehicle.

The memory 1730 may store and install instructions and/or programs such as applications, as well as various types of data such as files, etc. The processor 1710 may access and use data stored in the memory 1730 or may store new data in the memory 1730. The processor 1710 may also execute the programs installed in the memory 1730. In an embodiment, the memory 1730 may store information about map information and map reliability.

The processor 1710 may control the overall operation of the server 1700, and in particular, may control a process by which the server 1700 provides the map information to the vehicle. The processor 1710 may store signals or data input from the outside of the server 1700 or may operate using RAM used as a storage area corresponding to various jobs performed by the server 1700, a ROM storing a control program for controlling peripheral devices, or the like. The processor 1710 may be implemented as a system on chip (SoC) that is an integration of a core and a GPU. Also, the processor 1710 may include a plurality of processors.

The devices and servers described herein may include at least one processor, a memory for storing program data to be executed by the at least one processor, a permanent storage such as a disk drive, a communications port for handling communications with external devices, and user interface devices, including a display, keys, etc. When software modules or an algorithm are involved, these software modules or the algorithm may be stored as program commands or computer-readable code executable by the processor on a non-transitory computer-readable media such as read-only memory (ROM), random-access memory (RAM), CD-ROMs, magnetic tapes, floppy disks, and optical data storage devices. The computer-readable recording media may also be distributed over network coupled computer systems so that the computer-readable code is stored and executed in a distributed fashion. This media may be read by the computer, stored in the memory, and executed by the processor.

The embodiments may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques according to the related art for electronics configuration, signal processing and/or control, data processing and the like. The words "mechanism" and "element" are used broadly and are not limited to mechanical or physical embodiments, but may include software routines in conjunction with processors, etc.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method, performed by a device, of assisting with driving of a vehicle, the method comprising
    sensing, by using one or more sensors mounted on or in the vehicle, an ambient environment of a location of the vehicle at a time of the sensing,
    obtaining sensing information about the ambient environment based on the sensing of the ambient environment;
    comparing map information stored in the vehicle with the obtained sensing information;
    determining a map reliability of the map information based on a result of the comparing; and controlling, by the device, the driving, of the vehicle based on the determined map reliability, wherein the controlling comprises:

determining whether the map reliability is less than or equal to a predetermined threshold value;

based on a determination that the map reliability is greater than to the predetermined threshold value, maintaining a current driving mode of the vehicle and a current driving speed of the vehicle; and based on a determination that the map reliability is less than or equal to the predetermined threshold value, changing at least one of:

a driving mode of the vehicle from an autonomous driving mode to a manual driving mode, or a driving speed of the vehicle to a predetermined speed or less.

2. The method of claim 1, wherein the determining the map reliability comprises:

identifying, from driving record information stored in the vehicle, information about a number of times the location has been driven; and determining the map reliability based on the identified information about the number of times.

3. The method of claim 1, wherein the determining the map reliability comprises determining the map reliability based on covariance values of six degrees of freedom (6-DOF) of a map region corresponding to the location among regions of the map information.

4. The method of claim 1, wherein the determining the map reliability comprises determining the map reliability based on a sign sensed, by using the one or more sensors mounted on or in the vehicle, in the ambient environment.

5. The method of claim 1, wherein the controlling further comprises controlling, based on the determined map reliability, a map update of the vehicle.

6. The method of claim 1, wherein the controlling further comprises:

updating, based on the determination that the map reliability is less than or equal to the predetermined threshold value, the map information based on the sensing information.

7. The method of claim 1, wherein the controlling further comprises:

recommending a drivable route of the vehicle based on the determined map reliability; and outputting the recommended drivable route.

8. The method of claim 1, wherein the map information is received from a server and stored in the vehicle.

9. The method of claim 5, further comprising outputting information about at least one of the driving mode, the driving speed, and the map update.

10. A device for assisting with driving of a vehicle, the device comprising:

a memory storing one or more instructions; and at least one processor configured to execute the one or more instructions to:

obtain sensing information about an ambient environment of a location of the vehicle sensed by one or more sensors mounted in or on the vehicle, compare map information stored in the vehicle with the obtained sensing information, determine a map reliability of the map information based on a result of the comparing, and control the driving of the vehicle based on the determined map reliability, wherein the at least one processor is further configured to execute the one or more instructions to:

determine whether the map reliability is less than or equal to a predetermined threshold value;

based on a determination that the map reliability is greater than to the predetermined threshold value, maintain a current driving mode of the vehicle and a current driving speed of the vehicle; and based on a determination that the map reliability is less than or equal to the predetermined threshold value, change at least one of:

a driving mode of the vehicle from an autonomous driving mode to a manual driving mode, or a driving speed of the vehicle to a predetermined speed or less.

11. The device of claim 10, wherein the at least one processor is further configured to execute the one or more instructions to:

identify, based on driving record information stored in the vehicle, information about a number of times the location has been driven; and determine the map reliability based on the identified information about the number of times.

12. The device of claim 10, wherein the at least one processor is further configured to execute the one or more instructions to determine the map reliability based on covariance values of six degrees of freedom (6-DOF) of a map region corresponding to the current location among regions of the map information.

13. The device of claim 10, wherein the at least one processor is further configured to execute the one or more instructions to control a map update of the vehicle based on the determined map reliability.

14. The device of claim 10, wherein the at least one processor is further configured to execute the one or more instructions to:

based on the determination that the map reliability is less than or equal to the predetermined threshold value, update the map information based on the sensing information.

15. The device of claim 13, further comprising:

an output unit configured to output information about at least one of the driving mode, the driving speed, and the map update.

16. A non-transitory computer-readable recording medium having recorded thereon a program for performing the method of claim 1 in a computer.

* * * * *